United States Patent [19]

Brendle et al.

[11] Patent Number: 4,548,475
[45] Date of Patent: Oct. 22, 1985

[54] LIQUID CRYSTAL DISPLAY DEVICE WITH PARTIAL VACUUM IN PASSIVE REGIONS AND METHOD FOR MANUFACTURING SAME

[75] Inventors: Konrad Brendle, Dornstadt; Harald Schiffer, Kirchberg; Kurt Fahrenschon, Pfaffenhofen, all of Fed. Rep. of Germany

[73] Assignee: Licentia Patent Verwaltungs-GmbH, Fed. Rep. of Germany

[21] Appl. No.: 559,762

[22] Filed: Dec. 9, 1983

[30] Foreign Application Priority Data

Dec. 11, 1982 [DE] Fed. Rep. of Germany ....... 3245932

[51] Int. Cl.⁴ .............................................. G02F 1/13
[52] U.S. Cl. .................................. 350/334; 350/343; 350/344
[58] Field of Search ................................ 350/343, 344

[56] References Cited

U.S. PATENT DOCUMENTS 3,926,502  12/1975  Tanaka et al. .

FOREIGN PATENT DOCUMENTS 2707599   9/1977   Fed. Rep. of Germany .
2738305   3/1978   Fed. Rep. of Germany .
2506978  12/1982   France .
56-107214 11/1981  Japan .
57-45520   3/1982  Japan ................................. 350/343
57-72122   8/1982  Japan .
1336254  11/1973   United Kingdom .
1350601   4/1974   United Kingdom .
2014345A  8/1979   United Kingdom .

Primary Examiner—John K. Corbin
Assistant Examiner—Richard Gallivan
Attorney, Agent, or Firm—McGlew and Tuttle

[57] ABSTRACT

A liquid crystal display device comprises a plurality of electrically controllable active regions filled with liquid crystal and defined by a plurality of dams, and a plurality of empty passive regions also defined by the dams. An outer peripheral seal completes the closure of the active or passive regions and top and bottom cover plates are provided above and below the regions. The empty passive regions may be partially evacuated to increase the mechanical connection between the cover plates and the active regions may be connected by passages also defined by the dams so that a single filling port can be utilized to fill all of the active regions of liquid crystal.

15 Claims, 3 Drawing Figures

LIQUID CRYSTAL DISPLAY DEVICE WITH PARTIAL VACUUM IN PASSIVE REGIONS AND METHOD FOR MANUFACTURING SAME

FIELD AND BACKGROUND OF THE INVENTION

The present invention relates in general to liquid crystal display, and in particular to a new and useful display device utilizing a plurality of dams for confining active areas which contain a liquid crystal, and separating these areas from passive empty areas, as well as to a method of making such a device.

Liquid crystal display cells are known, which are called multi-function display panels and have a plurality of display regions (active regions) which can be electrically controlled independently of each other. It is usual in such multiple display devices to provide liquid crystal material between two cover plates also in the areas which cannot be electrically controlled (passive regions). Aside from the fact that such display cells contain substantially more liquid crystal material than needed for the display, their manufacture is also relatively complicated if large-surface cells are provided, and their mechanical stability is not always satisfactory.

SUMMARY OF THE INVENTION

The present invention is directed to a display device of the above mentioned kind, whose mechanical stability is increased even if designed as a large-surface display panel, and which can be manufactured in a simple way with an automatic process, and requires only a small amount of liquid crystal material.

Accordingly, an object of the present invention is to provide a liquid crystal display device having a plurality of separately electrically controllable active display regions, a plurality of non-controllable passive regions which are separated from the active regions of dams positioned between two cover plates, and liquid crystal disposed in the active regions and confined between the dams and the cover plates.

Another object of the invention is to provide such a liquid crystal display device wherein the passive regions are at least partially evacuated.

A further object is to connect the active regions by a plurality of connecting passages each defined by the dams so that a single filling port in the periphery of the device can be used to fall all the active regions with liquid crystal material.

The inventive passive regions or cavities which are provided between or among the active display regions and are evacuated, produce the effect of permanently pressing the two cover plates together, so that the plates remain spaced apart by a very constant distance which is determined by spacer elements or elevations provided therebetween on the cover plates. The connecting material applied in the manner of dams confines the passive cavities vacuum-tightly or at least pressure-tightly, so that no liquid crystal material can penetrate therein. Since the dams formed by an adhesive or a solder are firmly connected to the cover plates, the mechanical strength is augmented in addition, which is very advantageous particularly in large-surface panels. Moreover, liquid crystal material is saved, which is quite appreciable in view of the fact that generally, the active display areas cover less than 50% of the entire panel surface.

Another object of the invention is to provide a method of manufacturing the liquid display as set forth above which comprises applying a plurality of dams and a border sealing area or line to one cover plate, positioning the one cover plate with dam and sealing material in a vacuum environment, applying a second cover plate over the first cover plate and onto the dam and sealing material to close the active and passive regions except for at least one filling port communicating with the interior of the active regions, and filling the active regions through the filling port with liquid crystal material.

A further object of the invention is to provide a liquid crystal device which is insensitive to pressures normal to the cover plates, even with large active regions, which would otherwise disturb the liquid crystal material.

A still further object of the invention is to provide a liquid crystal display device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
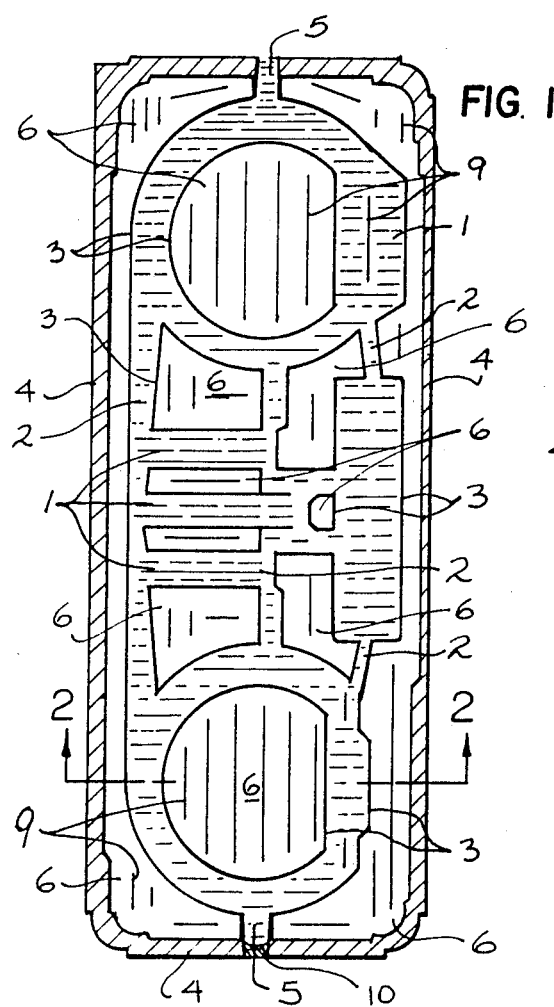
FIG. 1 is a top plan and schematic view of an automobile dashboard panel, positioned on end, and illustrating one embodiment of the inventive liquid crystal display device.

Referring to the drawings in particular, the invention embodied therein, in FIG. 1, comprises a liquid crystal dislay device having a plurality of dams 3 defining active liquid crystal filled regions 1 which are connected by passages 2 also defined by dams 3. Also defined by dams 3 and bounded by an outer peripheral seal 4, are a plurality of passive empty regions 6.

Figure 2:
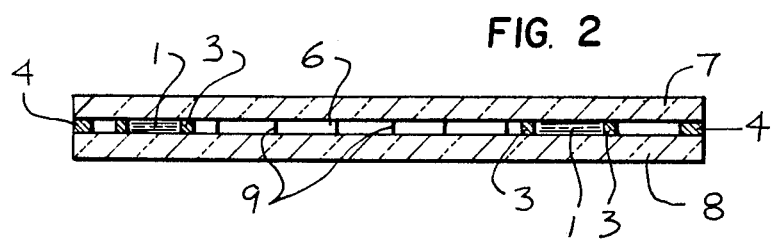
FIG. 2 is a cross-sectional view on enlarged scale and with exaggerated thickness taken on line 2—2 of FIG. 1.

In the active and passive regions, ridges or spacer elements 9 may be provided for maintaining a fixed relationship between a cover and a bottom plate 7,8 as shown in FIG. 2.

The passive regions 6, which are evacuated, do not contain material and are bounded by the dam-like low partitions 3 of adhesive or solder. The dams 3 at the same time substantially confine the active display regions 1 containing the liquid crystal material shown as liquid in the active display regions. The liquid crystal layer in these regions is interconnected by the connecting passages 2, again bounded by dams 3, which considerably facilitates the manufacture, more particularly the filling with the liquid crystal material. This material is introduced through one or more filling ports 5. Advantageously, port 5 extends through the additional connecting seam or seal 4 provided at the periphery of the device.

The solder or adhesive forming the dams 3 and the connecting seam 4 is advantageously applied in a screen printing process. The vacuum in the cavities 6 forming the passive regions is advantageously produced by pressing the two cover plates 7,8, which may be of glass or a plastic or flexible if necessary, against each other in a vacuum chamber and solidifying the adhesive or solder, so that the two cover plates become firmly secured to each other. The spacing between the cover plates is fixed by means of the interposed spacers 9.

Upon removing the cover plates thus connected to each other, the vacuum within the cavities of the passive regions is preserved. Then, the liquid crystal material is introduced through filling ports 5 and it penetrates through connecting passages 2 into the cavities of display regions 1. Finally, the filling ports 5 are closed, e.g. at 10. The closure 10 may be of the same material as dams 3 and seal 4.

Figure 3:
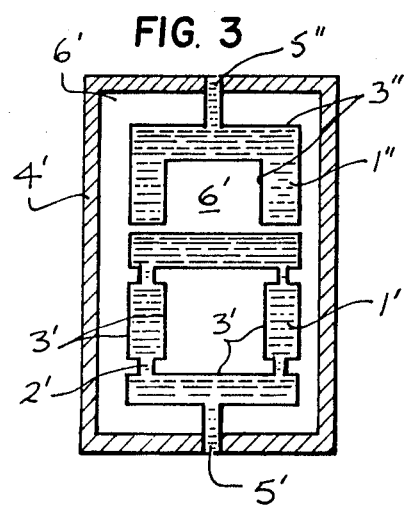
FIG. 3 is a top plan view similar to FIG. 1 of another embodiment of the invention.

According to a development of the invention, two or more groups of active display regions 3', 3" are provided as shown in FIG. 3. Within one group, the display regions are interconnected by passages 2'. The individual group 3", however, is not interconnected and is separated from groups 3'. Preferably, each group is filled with a different liquid crystal material. To this end, each group has a filling port 5',5" of its own. Even a single display region may form a separate group such as shown at 3".

While specific embodiments of the invention have been shown and described in detail to illustrate the application of the principles of the invention, it will be understood that the invention may be embodied otherwise without departing from such principles.

What is claimed is:

1. A liquid crystal display device comprising:
   a first cover plate;
   a plurality of elongated dams disposed on said first cover plate and arranged in a pattern to define a plurality of active electrically controllable regions on one side of each dam, and a plurality of passive regions on an opposite side of each dam all containing a partial vacuum;
   liquid crystal material filling each of said active regions;
   a second cover plate overlying and covering all of said active and passive regions, and connected to said first cover plate through said dams, said dams holding said first and second cover plates at a fixed spacing with respect to each other.

2. A device according to claim 1, including at least one passage communicating each active region with at least one other active region, each passage defined between a pair of said elongated dams.

3. A device according to claim 2, wherein at least one of said elongated dams comprises a peripheral seal sealed between and around a periphery of said first and second cover plates with at least one break in said seal forming a filling port communicating with at least one of said active regions and bounded by a pair of said elongated dams.

4. A device according to claim 1, including at least one of said elongated dams forming a peripheral seal sealed between and around a periphery of said first and second cover plates.

5. A device according to claim 1, wherein at least one of said cover plates is made of flexible material.

6. A device according to claim 1, wherein at least one of said cover plates is made of flexible material.

7. A device according to claim 6, wherein the other of said cover plates is made of glass.

8. A device according to claim 1, wherein at least one of said cover plates is made of glass.

9. A device according to claim 1, wherein one of said elongated dams forms a peripheral seal connected between and extending around the periphery of said first and second cover plates and a plurality of filling ports defined through said seal and each communicating with one different active region, said plurality of active regions divided into a plurality of groups of regions, each group of regions communicating with one of said filling ports and a passage connected between and communicating one region of one group with at least one other region of said one group.

10. A device according to claim 9 wherein each of said passive regions is fully bounded by said first and second cover plates and by at least one of said elongated dams.

11. A device according to claim 1, including a plurality of spacer elements connected between said first and second cover plates and disposed in at least some of said active and passive regions.

12. A method of manufacturing a liquid crystal device having a pair of cover plates comprising:
   forming a plurality of elongated dams on one of said cover plates in a pattern to define a plurality of active regions for containing liquid crystal material and a plurality of passive regions;
   applying an elongated peripheral seal material around a periphery of the one cover plate to close off at least some of said passive regions;
   positioning the one cover plate with the dams and seal in a partial vacuum environment;
   applying the other cover plate over the one cover plate and onto and into sealing connection with the dams and the seal to establish a partial vacuum in each of the passive regions;
   providing at least one filling port through the seal and into communication with at least one of the active regions; and
   filling the active region through the filling port with liquid crystal material.

13. A method according to claim 12, including defining a passage between each active region and at least one other active region using the elongated dams and filling all of the active regions connected by passages through the filling port.

14. A method according to claim 13, including positioning spacer elements in at least some of the passive regions before the cover plates are connected together for maintaining a spacing between the cover plates.

15. A method according to claim 14, including providing a second filling port through the seal communicating with at least one active region which is not connected to any other active region over a passage and filling the one active region through the second filling port with a liquid crystal material different from liquid crystal material in the other active regions.

* * * * *